May 8, 1962 J. J. PIROS 3,033,040
DENSITY MEASURING APPARATUS
Filed Sept. 11, 1959 2 Sheets-Sheet 1

INVENTOR.
John J. Piros
BY Adams, Forward & McLean
ATTORNEYS

May 8, 1962 J. J. PIROS 3,033,040
DENSITY MEASURING APPARATUS
Filed Sept. 11, 1959 2 Sheets-Sheet 2

INVENTOR.
John J. Piros
BY
ATTORNEYS

United States Patent Office 3,033,040
Patented May 8, 1962

3,033,040
DENSITY MEASURING APPARATUS
John J. Piros, Homewood, Ill., assignor to Sinclair Refining Company, New York, N.Y., a corporation of Maine
Filed Sept. 11, 1959, Ser. No. 839,534
4 Claims. (Cl. 73—438)

This invention relates to measuring the density of liquids and to controlling the proportion of constituent liquids present in blends so that the blend has a given density.

In the handling of petroleum stocks, for example, it is frequently desired to blend two stocks which differ in density to obtain a blend having a fixed density and to transport the blend through a pipeline to a plant where it is used, stored or refined. Usually it is desired to blend the two stocks in the pipeline. In practice, this requires continuously measuring the density of the blend and adjusting valves in pipelines carrying the stocks as is required to maintain the desired blend density. Control systems heretofore used to control blending in this manner have the disadvantage that there is a long time delay between the time the density of the blend varies from the desired value and the time that the system effects correction to return the blend to the desired value. The invention provides a novel means for continuously measuring the density of a liquid flowing through a conduit and this means is characterized by a short response time so when used in a blending control system, the time delay between variation and correction is significantly reduced over the time delay heretofore commonly involved. Moreover, the density measuring means of the invention is more accurate than instruments heretofore commonly used, and hence permits more accurate blending.

According to the invention, density of a liquid is measured by steps including continuously withdrawing a sample of the liquid, introducing the withdrawn sample into an inclined conduit at a lower level thereof, maintaining a superatmospheric pressure at an upper level of the conduit and measuring the pressure of the liquid in the conduit a fixed distance below said upper level relative to said super-atmospheric pressure. The temperature of the liquid, rate of flow of the liquid through the conduit, and the conduit dimensions are maintained so that the pressure difference is a measure of the density of the liquid. In general, in order that the density measuring device be of suitable dimensions, the pressure measuring device must be highly sensitive so that the height of the conduit will not be too large. I have found that strain gages have sufficient sensitivity so that pressure gages employing the strain gage principle are in general satisfactory for use in the density measuring device of the invention. Strain gages comprise an electrical resistor mounted so that upon a change in the variable to be measured, e.g. a pressure difference, the resistor is extended or contracted and hence its resistance is changed. The resistor is connected in a circuit so that change in the resistance thereof is effective to operate an indicator, recorder, and/or controller. When controlling the blending of liquids, the strain gage output is advantageously used to record the density of the blend and to control valves in the conduits carrying the liquids blended to properly proportion these liquids.

The invention will now be described with reference to an embodiment thereof adapted for use in connection with blending of petroleum stocks. This embodiment is depicted in the accompanying drawing, of which:

Figure 1:
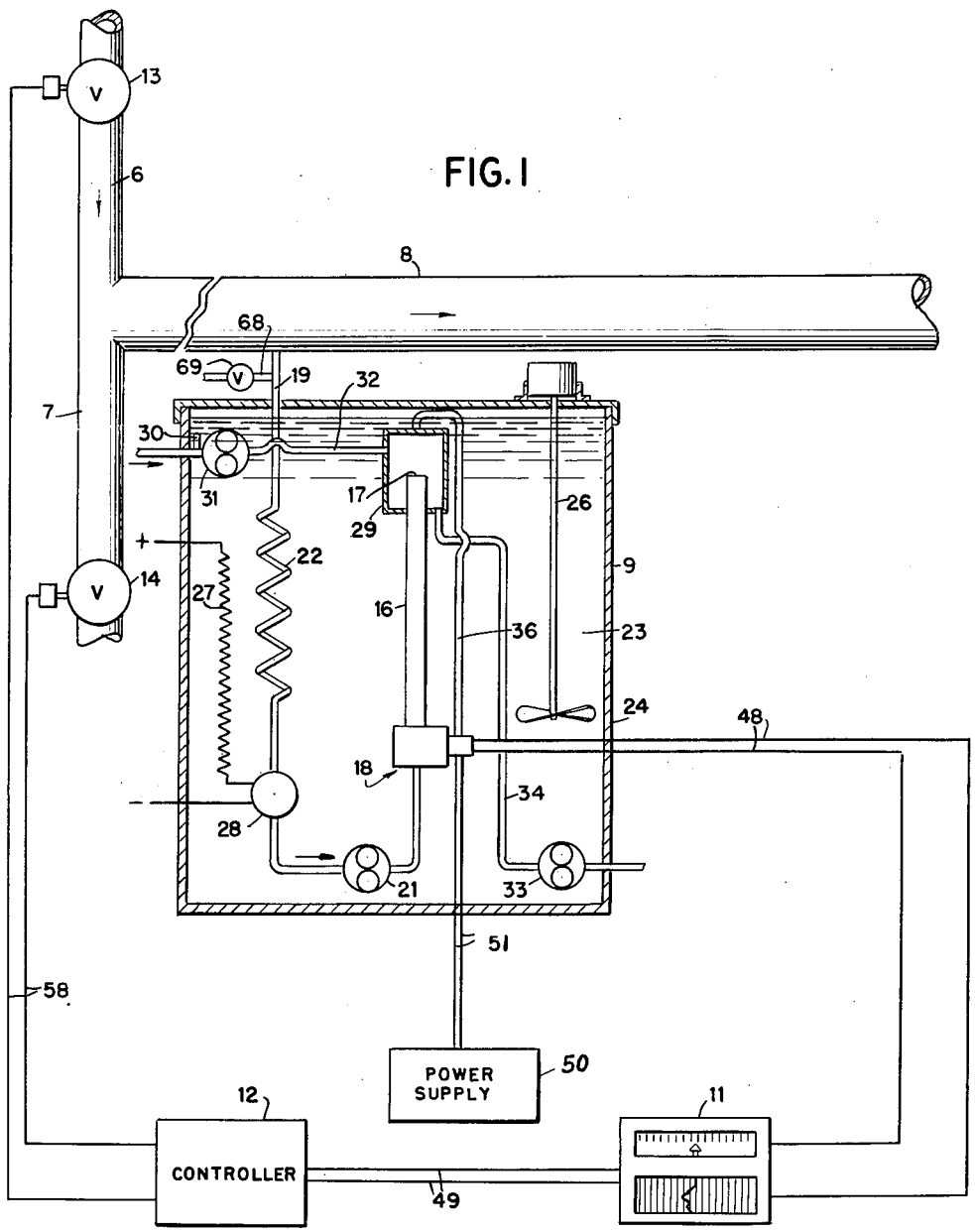
FIG. 1 is a schematic diagram showing a density measuring device of the invention installed to control the blending of two liquids of different densities.

Referring to FIGURE 1 of the drawing, a liquid of one density flowing in the direction indicated in pipe 6 impinges directly with liquid of another density flowing in the direction indicated in pipe 7 and the resulting blend flows through pipe 8. A density meter 9 continuously measures the density of the blend carried in pipe 8 and is operatively connected to recorder-indicator 11, and controller 12. The controller is effective to control the proportion of the liquids carried by lines 6 and 7 by operating the valves 13 and 14 mounted respectively in lines 6 and 7. Thus, blending is controled by controller 12 which is responsive to the density meter 9.

The density measuring device 9 includes a vertically extending conduit 16 provided with a device adapted to maintain a superatmospheric pressure at its upper end 17 and pressure measuring device 18 at its lower end. A portion of the petroleum blend flowing in pipe 8 is pumped at a constant rate through flow line 19 and conduit 16 by gear pump 21. In order to maintain liquid flowing through the conduit 16 at a constant temperature, line 19 includes a coil 22 and the coil and conduit are immersed in a constant temperature oil bath 23 held in a tank 24, and the tank is equipped with an agitator 26 and heating element 27 which is controlled by a mercury thermo-regulator 28 mounted either in flow line 19 or in oil bath 23.

The pressure maintaining device provided at the upper end 17 of conduit 16 is adapted to maintain a super-atmospheric pressure since the petroleum blend has an appreciable vapor pressure and hence bubbles, which would interfere with the operation of the density measuring device, are otherwise likely to form in conduit 16. The pressure maintaining device comprises a container 29 into which the upper end 17 of the conduit 16 extends partway so that liquid issuing from the conduit overflows into the container. A gas, which can be air, is pumped by gear pump 31 through line 32 to the container. An oiler 30 is mounted on line 32 and feeds a few drops of oil per day to the gear pump 31. Gas and liquid are withdrawn from container 29 by gear pump 33 through line 34. Gear pumps 31 and 33 are of such capacity that the desired superatmospheric pressure is maintained in container 29.

Figure 2:
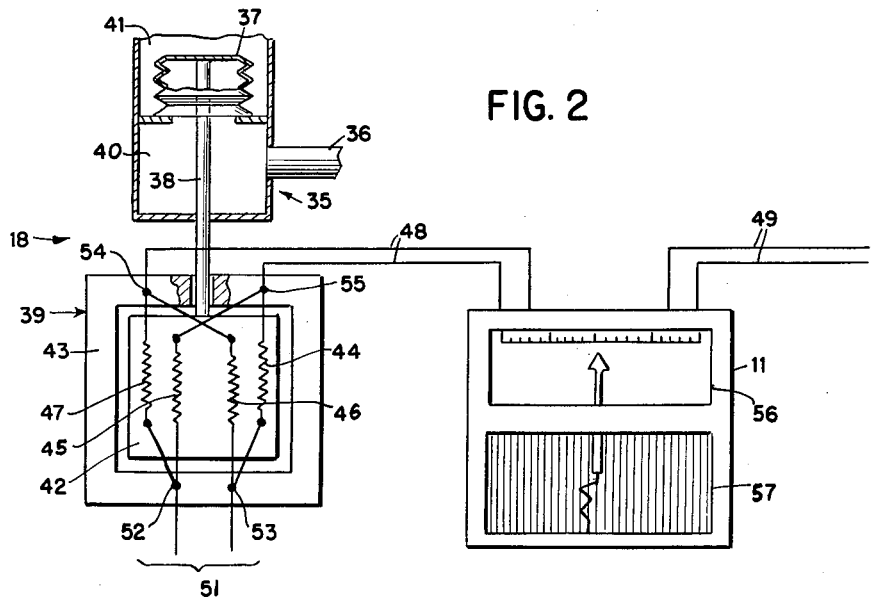
FIG. 2 is a schematic diagram of the pressure measuring means employed in the device shown in FIG. 1.

The pressure measuring device 18 masures the pressure difference between the pressure maintained in container 29 and the pressure a fixed distance below the upper end 17 of the conduit 16 where pressure measuring device 18 is disposed. The container 29 is vented to the pressure measuring device 18 by line 36. The pressure measuring device is shown schematically in FIGURE 2.

The pressure measuring device has a transducer 35 which comprises a bellows 37 having a rod 38 rigidly thereto and operatively connected to a strain gage 39. The high pressure side 41 of the bellows is exposed to the pressure of the column of liquid in the conduit 16 and the low pressure side 40 is exposed by line 36 to the pressure of container 29 (FIG. 1). The strain gage 39 comprises an armature 42, fixedly positioned frame 43, and extensible resistors 44, 45, 46, 47 which are wired so that each one forms a leg of a Wheatstone bridge. The bridge receives power at terminals 52 and 53 from power source 50 (FIG. 1) through power lines 51, and a receiver, shortly to be described, is connected across the terminals 54 and 55 of the bridge proper. The resistors are secured to the armature and the frame so that upon movement of the armature, two of the resistors are contracted and two are elongated. Thus, movement of the armature 42 changes the resistance of the resistors and changes the potential across the bridge proper.

Movement of the armature is controlled by rod 38 which is rigidly secured thereto. Movement of the rod 38 is directly proportional to the pressure difference across the bellows 37 and hence to the pressure on high pressure side 41 of the bellows, and hence extension or contraction of the resistors, and therefore change in potential across the bridge, is directly proportional to the pressure on the high pressure side 41 of the bellows. Thus, the pressure measuring device is adapted to provide a potential which is a measure of the pressure difference across the conduit 16. This potential is employed to indicate, record and control the density of the blend.

The receiver connected across the bridge proper of the strain gage Wheatstone bridge is indicator-recorder 11 which is connected by power lines 48 with bridge terminals 54 and 55. The receiver has an indicating dial 56 and a recording chart 57, which are adapted, respectively, to indicate and record the density of the blend. Indicator-recorder 11 is effective also to send a signal through power lines 49 to controller 12. The controller 12 can be set to the density value desired for the blend and will maintain this value by sending signals to valves 13 and 14 over power lines 58 in response to signals received by the controller from indicator-recorder 11.

Figure 3:
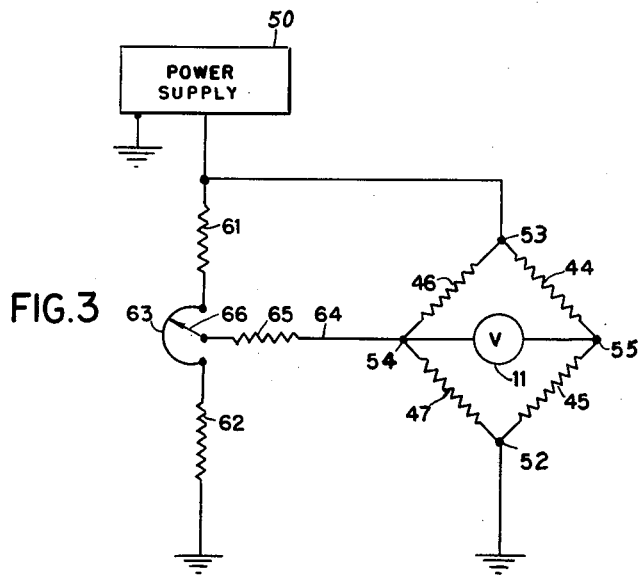
FIG. 3 is a wiring diagram for the pressure measuring means shown in FIG. 2.

A wiring diagram for the strain gage 39 is shown in FIG. 3. Power supply 50 provides a D.C. supply which can be varied from 5 to 13 volts; exact voltage depending on span of gravities desired to be measured. This voltage is applied across the bridge comprising resistors 44, 45, 46 and 47, and also across a calibrating circuit comprising fixed resistors 61 and 62 and variable resistor 63. The indicator-recorder 11 which is a millivolt meter is connected across the bridge proper. The calibrating circuit is connected with bridge terminal 54 by slide wire 66, fixed resistor 65 and conductor 64. The indicator-recorder 11 can be calibrated by passing a sample of known density through the density meter 9 (FIG. 1) and moving slide wire 66 over variable resistor 63 until the correct density for the sample is indicated by the indicator-recorder 11. For use when calibrating the instrument, a sample inlet line 68 provided with a valve 69 is connected to line 19 (FIG. 1).

If desired, the indicator-recorder 11 can be calibrated so that it indicates directly the ° API gravity of the petroleum blend at 60° F. though the portion of the blend metered by density meter 9 is maintained at a temperature other than 60° F.

*Example*

The arrangement depicted in FIG. 1, except that there was a T in line 8 between the junction of line 6 and line 7 and the density meter 9, was used to control blendings of petroleum crudes. The density meter 9 was located about 15 feet from the mixing point at the junction of line 8 and line 9. The conduit 16 was a 16″–½″ diameter copper tube; pressure measuring device 18 was Stratham Differential Pressure Transducer Model P5-1D (a product of Stratham Laboratories, Inc., Los Angeles 64, California) having a range of ±1.0 p.s.i.; sample gear pump 21, gas gear pump 31 and withdrawal gear pump 33 were of 12, 6, and 18 liters/hour capacity respectively; the constant temperature oil bath 23 was formed by 15 gallons of oil; the heating element 27 was a 500 to 1000 watt heating element, and the indicator-recorder had a 0 to 2.5 millivolt range and covered a ° API range of 20—50.

In operation, 12 liters per hour of blend were pumped through the conduit 16, a pressure of 30 p.s.i.g. was maintained in container 29 and the temperature of the blend passing through the conduit was maintained to within ±0.2° F.

By using the meter for blending petroleum crudes, it was found that it responds to a gravity change of less than 0.1° API and is accurate to ±0.1° API, and that it has a lag of about 30 to 35 seconds for 90% response to a change in gravity. One commonly used density meter has a response time of approximately 15 minutes for 90% recovery and a sensitivity and accuracy of ±0.2 to 0.3° API. Moreover, the accuracy of the meter of the invention is about the accuracy with which one operator can check another when running gravities on the same stock. Further, the meter of the invention does not drift when operated for extended periods of time, and is effective to control blending without any significant hunting of the valves in the lines carrying the liquids to be blended, when the gravity difference between the crudes blended is as little as 2.5° API. Moreover, the meter is suitable for metering different liquids since the friction drop in the conduit 16 is not detected by the pressure measuring device 18 and hence changes in friction drop in the conduit incidental to metering different liquids does not significantly affect the usefulness of the instrument.

For the blending system of the example, the lag for a 90% response to a change in gravity was about 1 minute. This short lag time is attributable in part to the proximity of the mixing point and density meter. Notwithstanding this proximity, the composition of the blend at the density meter was uniform.

This application is a continuation-in-part of application Serial No. 680,957, filed August 29, 1957, now abandoned.

I claim:

1. Apparatus for measurement of density of a liquid including an inclined conduit closed at its lower end and opened at its upper end, means connected to the upper end of said conduit defining an enclosure therefor extending above and below the upper end of said conduit, means connected to a lower level to said conduit for introducing the liquid into said conduit to pass said liquid through said conduit overflowing into said enclosure at the upper end of said conduit, means connected to said enclosure means for introducing a gas under superatmospheric pressure into said enclosure, means connected to said enclosure means at a position below the upper end of said conduit for withdrawing liquid overflow and gas from said enclosure at a rate maintaining said gas at a superatmospheric pressure in said enclosure, and pressure measuring means connected to said conduit at a lower level therein and connected to said enclosure means above the upper end of said conduit for measuring the pressure difference between the gas pressure in said enclosure and the liquid pressure at such lower level in said conduit.

2. Apparatus according to claim 1 in which said means for introducing liquid, said means for introducing gas and said means for withdrawing liquid and gas are constant flow rate devices.

3. Apparatus according to claim 1 comprising temperature control means for maintaining the temperature of liquid flowing through said conduit constant.

4. Apparatus for measurement of density of a liquid including an inclined conduit closed at its lower end and opened at its upper end, a container into which the upper end of said conduit extends, means connected at a lower level in said conduit for introducing the liquid into said conduit to pass said liquid through said conduit overflowing into said container, means connected to said container for introducing a gas under a superatmospheric pressure into said container, means connected to said container at a position below the upper end of said conduit for withdrawing liquid overflow and gas from said container at a rate maintaining said gas at a superatmospheric pressure in said container, and pressure measuring means connected to said conduit at a lower level therein and connected to said container above the upper end of said conduit for measuring the pressure difference between the gas pressure in said container and the liquid pressure at such lower level in said conduit, said pressure measuring means including an electrical circuit having an extensibly mounted electrical resistor, a transducer responsive to said pressure difference and effective to control the length of said resistor, whereby the resistance thereof is controlled, and means responsive to change in resistance of said resistor.

References Cited in the file of this patent

UNITED STATES PATENTS

| | | |
|---|---|---|
| 1,932,228 | Postel | Oct. 24, 1933 |
| 2,455,200 | Wallace | Nov. 30, 1948 |
| 2,652,846 | Dunn | Sept. 22, 1953 |
| 2,720,113 | Statham | Oct. 11, 1955 |